United States Patent
Chang et al.

(10) Patent No.: US 10,237,554 B2
(45) Date of Patent: Mar. 19, 2019

(54) METHOD AND APPARATUS OF VIDEO ENCODING WITH PARTITIONED BITSTREAM

(71) Applicant: MEDIATEK INC., Hsin-Chu (TW)

(72) Inventors: Yung-Chang Chang, New Taipei (TW); Chi-Cheng Ju, Hsinchu (TW); Yi-Hau Chen, Taipei (TW); De-Yuan Shen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 182 days.

(21) Appl. No.: 15/273,733

(22) Filed: Sep. 23, 2016

(65) Prior Publication Data

US 2017/0013263 A1    Jan. 12, 2017

Related U.S. Application Data

(63) Continuation of application No. 13/295,956, filed on Nov. 14, 2011, now abandoned.

(51) Int. Cl.
| | |
|---|---|
| *H04N 19/124* | (2014.01) |
| *H04N 19/91* | (2014.01) |
| *H04N 19/174* | (2014.01) |
| *H04N 19/423* | (2014.01) |
| *H04N 19/436* | (2014.01) |
| *H04N 19/13* | (2014.01) |
| *H04N 19/152* | (2014.01) |
| *H04N 19/184* | (2014.01) |
| *H04N 19/61* | (2014.01) |

(52) U.S. Cl.
CPC ........... *H04N 19/124* (2014.11); *H04N 19/13* (2014.11); *H04N 19/152* (2014.11); *H04N 19/174* (2014.11); *H04N 19/184* (2014.11); *H04N 19/423* (2014.11); *H04N 19/436* (2014.11); *H04N 19/91* (2014.11); *H04N 19/61* (2014.11)

(58) Field of Classification Search
CPC ............................ H04N 19/91; H04N 19/176
See application file for complete search history.

(56) References Cited

U.S. PATENT DOCUMENTS

| | | |
|---|---|---|
| 2005/0129129 A1 | 6/2005 | Winger |
| 2005/0168470 A1* | 8/2005 | Prabhakar ............. H04N 19/70 345/531 |
| 2007/0098078 A1 | 5/2007 | Kim |
| 2008/0310515 A1 | 12/2008 | Matsuba |
| 2009/0175349 A1 | 7/2009 | Ye |
| 2009/0290636 A1 | 11/2009 | Liu |

FOREIGN PATENT DOCUMENTS

CN            101557521 A      10/2009

\* cited by examiner

*Primary Examiner* — Zhubing Ren
(74) *Attorney, Agent, or Firm* — Winston Hsu

(57) ABSTRACT

A method and apparatus for video encoding to generate a partitioned bitstream without buffering transform coefficient and/or prediction data for subsequent coding units are disclosed. An encoder incorporating an embodiment according to the present invention receives first video parameters associated with a current coding unit, wherein no first video parameters associated with subsequent coding units are buffered. The encoder then encodes the first video parameters to generate a current first compressed data corresponding to the current coding unit. A first memory address in the first logic unit is determined and the encoder provides the current first compressed data at the first memory address in the first logic unit.

16 Claims, 11 Drawing Sheets

Fig. 3  *Prior Art*

METHOD AND APPARATUS OF VIDEO ENCODING WITH PARTITIONED BITSTREAM

CROSS REFERENCE TO RELATED APPLICATION

This is a continuation of U.S. patent application Ser. No. 13/295,956, filed on Nov. 14, 2011 and incorporated herein by reference.

FIELD OF THE INVENTION

The present invention relates to video encoding system. In particular, the present invention relates to system architecture of a video encoder generating a bitstream with partitioned structure.

BACKGROUND

Motion compensated inter-frame coding has been widely adopted in various coding standards, such as MPEG-1/2/4 and H.261/H.263/H.264(AVC). VP8 is a recent motion compensated video codec (encoder-decoder) being adapted for some software, hardware, platform and publish environments. The VP8 coding algorithm is similar to H.264 Simple Profile. However, VP8 is tailored to simplify encoding and decoding complexity while delivering about the same performance as the H.264 Simple Profile. One of the VP8 codec features is that the bitstream format is suited for parallel decoding to take advantage of the trend of multiple-core processors in the consumer electronic environment or multiple-cores CPU in the personal computer environment. In order to support parallel decoding, the VP8 bitstream partitions the compressed data into two categories, where the category I partition includes coding modes (mb_mode, sub_mb_mode, mb_skip, etc.), reference index, intra prediction mode, QP information, filter parameter, motion vectors of macroblock, etc. in the frame, and the category II partition includes quantized transform coefficients of residues for the macroblock. The partition associated with the category II, i.e., transform coefficients, can be packed into more than one partition on the basis of row of macroblocks, and a partition token may be used to indicate the association between a macroblock row and one of the packed category II partitions. Since the information associated with the transform coefficients are packed after the prediction data for the whole frame are packed, a conventional encoder system may have to store the transform coefficients for the whole frame. Accordingly, it is desirable to develop an encoder system that provides the partitioned bitstream without the need to store the transform coefficients for the whole frame.

SUMMARY

A method and apparatus for video encoding to generate partitioned bitstream are disclosed, where partitioned bitstream comprising a first logic unit and a second logic unit, the first logic unit comprises first compressed data corresponding to coding units of a coding unit group, and the second logic unit comprises second compressed data corresponding to the coding units. In one embodiment according to the present invention, the method and apparatus of video encoding to generate partitioned bitstream comprises receiving first video parameters and second video parameters, wherein the first video parameters correspond to either quantized transform coefficients or other non-transform-coefficient coding data of the coding units, but not both, and the second video parameters correspond to either the non-transform-coefficient coding data or the quantized transform coefficients of the coding units not belonging to the first video parameters; storing the first video parameters associated with one or more coding units including a current coding unit in a first buffer, wherein whenever first video parameters associated with one coding unit are available in the first buffer, an entropy coder is operable to start processing the first video parameters associated with said one coding unit; encoding the first video parameters stored in the first buffer to generate a current first compressed data corresponding to the current coding unit; determining first memory address in the first logic unit; and providing the current first compressed data at the first memory address for the first logic unit before the whole second logic unit is generated and providing current second compressed data corresponding to the second video parameters for the second logic unit before the whole first logic unit is generated, wherein the first compressed data and the second compressed data associated with one or more same coding units are provided to the first logic unit and the second logic unit respectively.

DETAILED DESCRIPTION

Figure 1:
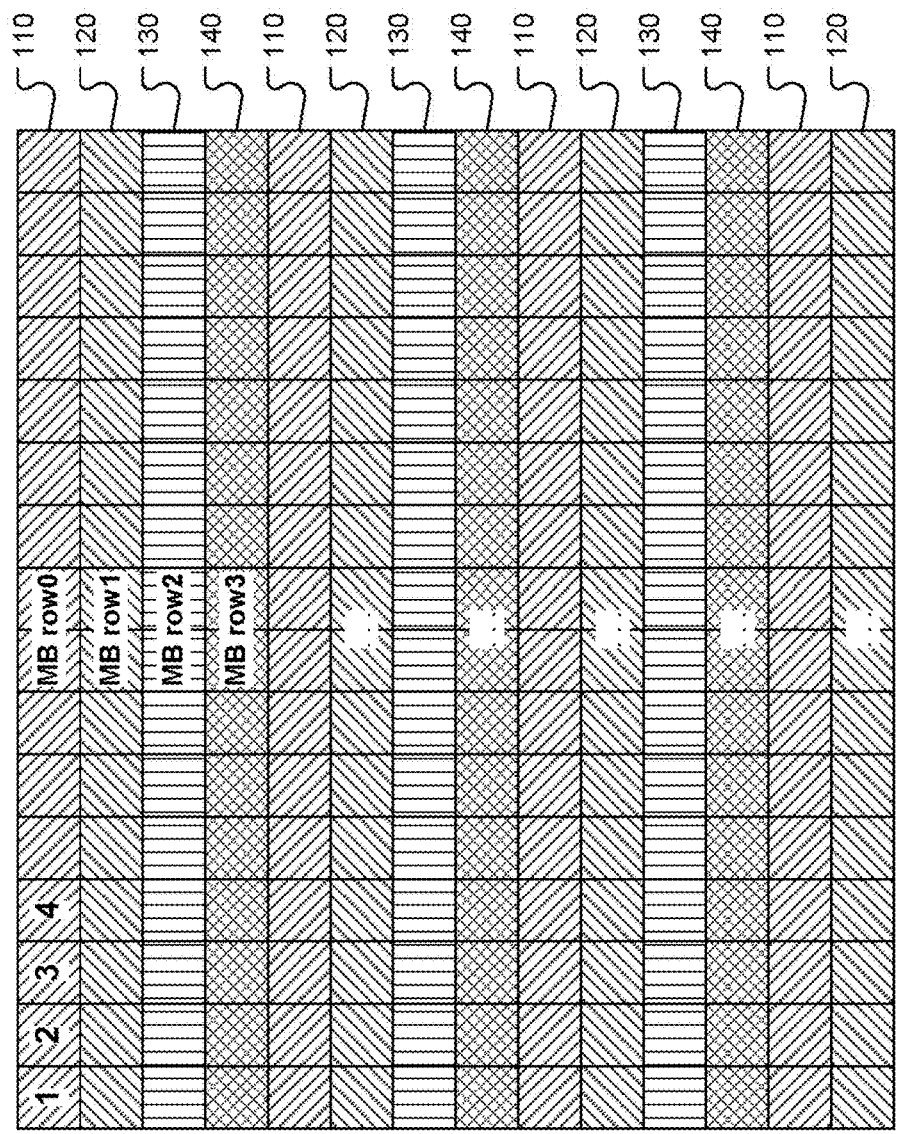
FIG. 1 illustrates an example of dividing a frame into macroblocks and associating each row of macroblock with one of four picture partitions.

FIG. 1 illustrates a picture frame that is divided into picture coding units, such as macroblocks (MBs) in various video coding standards including VP8. However, the coding unit may be configured into other sizes. Transform coefficients for each row of macroblocks can be assigned to one of bitstream partitions corresponding to transform coefficients as indicated by the token. For example, in the FOUR_TOKEN_PARTITION mode, transform coefficients from macroblock rows 0, 4, 8, etc. (termed as one region of the picture), are packed into the first bitstream partition corresponding to transform coefficients; coefficients from macroblock rows 1, 5, 9, etc. (also termed as a region of the picture), are packed into the second bitstream partition corresponding to transform coefficients, and soon. The four picture partitions (i.e., four regions) are labeled as 110, 120, 130 and 140 respectively in FIG. 1. Though the transform coefficients are packed into different partitions, the entropy contexts used to encoding them are the same as the case where all transform coefficients are packed into a single partition with all macroblocks coded in raster scan order. The VP8 bitstream format allows up to eight transform coefficient partitions.

Figure 2:
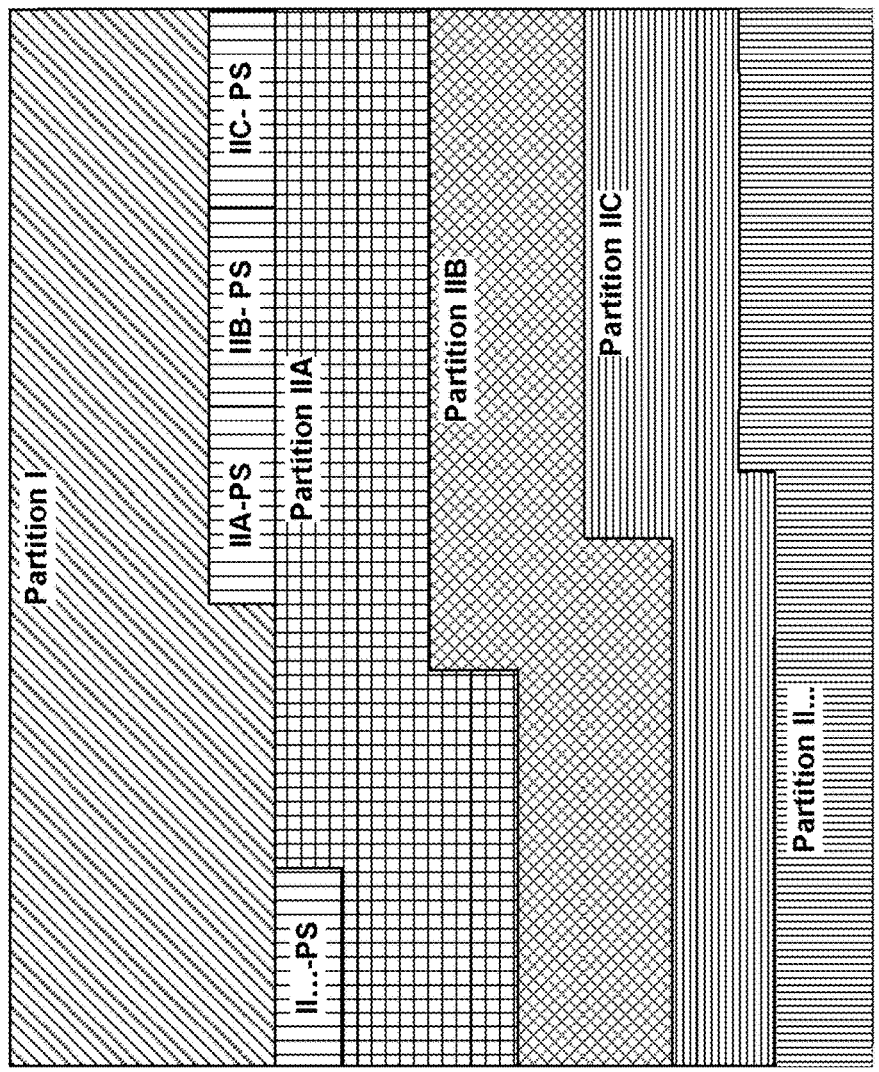
FIG. 2 illustrates an example of partitioned bitstream structure, where the category I partition comprises prediction data for the frame and partition sizes of subsequent transform coefficient partitions followed by category II partitions corresponding to transform coefficient data.

FIG. 2 illustrates an example of bitstream format with data partition according to VP8. A bitstream having data partition is termed as partitioned bitstream in this disclosure. Partition I corresponds to the category I partition, which includes the macroblock coding modes and motion vectors of a frame according to the raster scan order in this example. The coding modes and motion vectors associated with macroblocks of the frame are packed using an entropy coder. At the end of the category I partition, information regarding the partition sizes of category II partitions is appended, which is labeled as IIA-PS, IIB-PS, IIC-PS and etc. Partition IIA, Partition IIB, Partition IIC, and etc. are appended after Partition I. Each of the category II bitstream partitions corresponds to one picture partition of the frame. For the example of FIG. 2, Partition IIA is associated with the picture partition corresponding to macroblock rows 0, 4, 8, etc. Data partition according to VP8 allows decoders to take advantage of multiple cores to decode/encode multiple rows of macroblocks at the same time. Since coding modes and motion vectors data associated with macroblocks of the frame are packed into a partition separately from the transform coefficients for the macroblocks, it allows reference data pre-fetching and parallel decoding of more than one macroblock rows. While the picture shown in FIG. 1 illustrates that the picture is partitioned into four regions so that category II partition is divided into four category II sub-partitions (i.e., Partition IIA through Partition IID), the present invention disclosed herein is also applicable to the case with no picture partition. In other words, there is only one category II partition if there is no picture partition. Nevertheless, the bitstream is still partitioned in this case (i.e., Partition I and Partition II).

Figure 3:
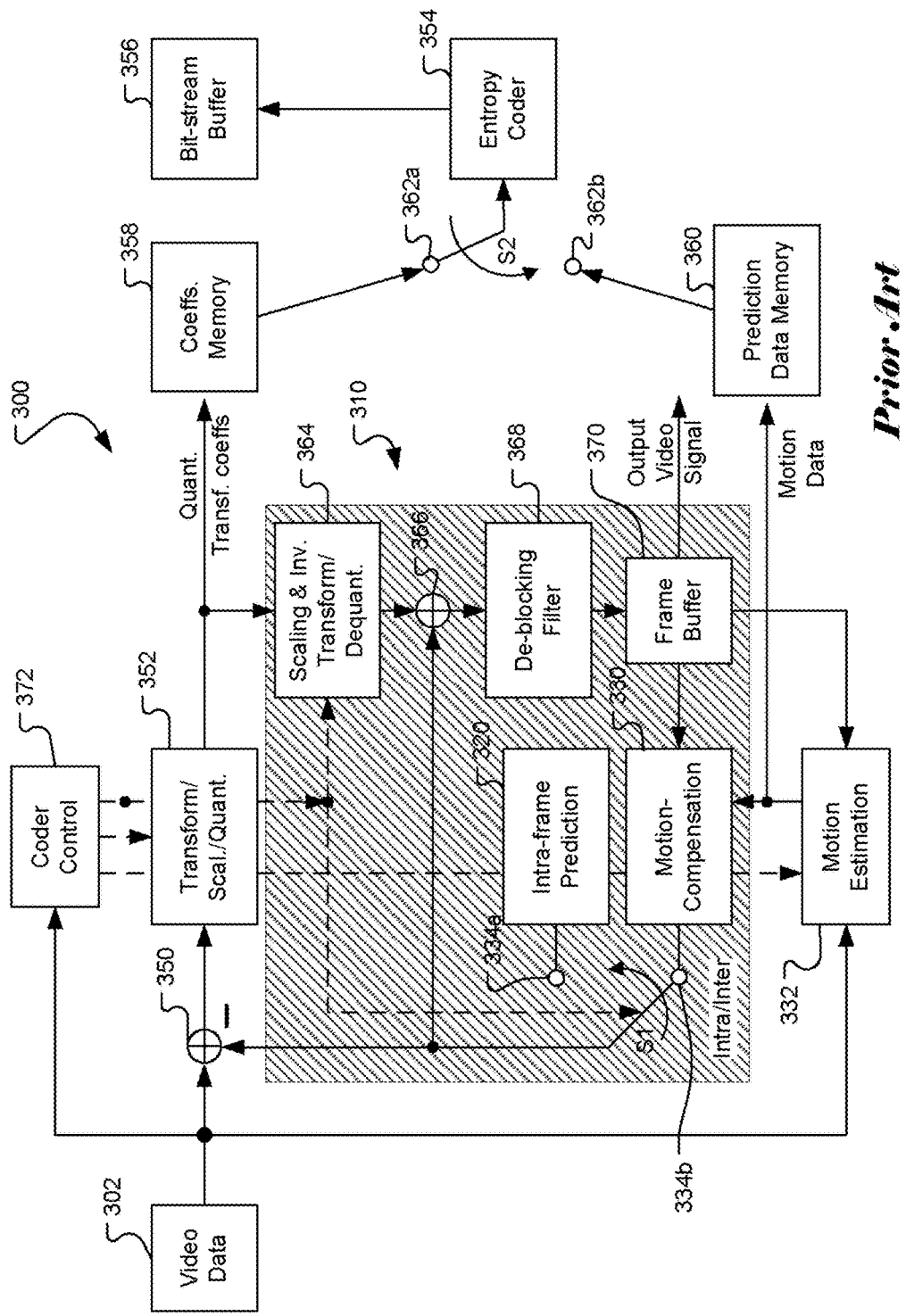
FIG. 3 illustrates a system block diagram for a motion compensated encoder comprising transform coefficient memory and prediction data memory for the frame to generate partitioned bitstream.

FIG. 3 illustrates an exemplary motion-compensated encoding system 300 which can select between Intra and Inter prediction modes according to switch S1 position. The input video data 302 often are represented in color components, such as luminance Y and chrominance UV. The encoding system 300 includes a local decoder 310 to reconstruct reference data needed for Intra and Inter prediction. Intra-prediction 320 is responsible to provide prediction data based on reconstructed video data in the same frame. For inter-prediction, motion estimation (ME) 332 and motion compensation (MC) 330 are used to provide prediction data based on previously reconstructed frame or frames. Switch S1 selects intra-prediction 334a or inter-prediction data 334b and the selected prediction data are supplied to adder 350 to form prediction errors, also called residues. The prediction error is then processed by transformation, scaling and quantization 352. The quantized transform coefficients corresponding to residues are than coded by entropy coder 354 to form a part of bitstream corresponding to the transform coefficients and the bitstream is stored in bitstream buffer 356. The bitstream associated with the transform coefficients is then packed with side information such as coding modes and motion vectors associated with macroblocks of the frame. The side information may also be subject to entropy coding to increase coding efficiency and accordingly the data associated with the side information are provided to entropy coder 354 as shown in FIG. 3. Since the VP8 bitstream format packs the coding modes and motion vectors associated with macroblocks for a whole frame in the category I partition, a coefficient memory 358 is used to store the transform coefficients for the frame. In addition, a prediction data memory 360 is used to store coding modes and motion vectors associated with macroblocks of the frame. In the example of FIG. 3, both transform coefficients and modes/motion vectors share the same entropy coder 354. Switch S2 is used to select data input to the entropy coder 354. At location 362a, the transform coefficients is fed to the entropy coder 354 and at location 362b, the modes/motion vectors are fed to the entropy coder 354. In order to reconstruct the reference frame/blocks at the encoder end, scaling, inverse transform and de-quantization 364 is used to recover the residues. The residues are then added back to reference from intra-prediction 334a or inter-prediction data 334b using adder 366. The reconstructed video data may be subject to coding artifacts which are more prominent around block boundaries. Therefore, deblocking filter 368 is applied to the reconstructed video data before the video data are stored in the frame buffer 370 in order to improve video quality. The encoder system 300 also includes a coder control 372 to provide control signals to select between Intra and Inter modes, to select parameters for scaling and quantization, and to make decision for motion estimation 332. FIG. 3 illustrates an implementation of an encoder system that can support the bitstream partition as mentioned above.

The use of coefficient memory 358 and prediction data memory 360 allows the coefficients and prediction data of a whole frame to be buffered temporarily. Since the coefficients and prediction data of a frame are buffered, the entropy coder 354 can process the coefficients and prediction data in the order as specified in bitstream format. For example, the bitstream for Partition I can be generated by applying entropy coder 354 to the modes/motion vectors stored in the prediction data memory 360 on a coding unit by coding unit basis in a raster scan order and the compressed data is written sequentially into a space in the bitstream buffer 356. The compressed data for the prediction data are written into Partition I data area in the bitstream buffer 356. The Partition I data area is termed as a Partition I logic unit in this disclosure. To store the compressed data of the prediction data associated with a current coding unit properly, an address has to be determined. If the compressed data are written sequentially, a current address may be determined according to a previous address and data size of compressed data for the previous coding unit. The use of transform coefficient memory 358 and prediction data memory 360 provides some convenience for the system design since the compressed data corresponding to prediction data associated with coding units of the frame can be stored to Partition I area of bit-stream buffer 356 one coding unit after another coding unit. Similarly, the compressed data corresponding to quantized transform coefficients associated with coding units of the frame can be stored in Partition II areas of bit-stream buffer 356 one coding unit after another coding unit. However, transform coefficient memory 358 and prediction data memory 360 are quite large since these data are in an un-compressed format and these data are buffered for a whole frame. In addition, an encoder system always needs frame buffer to store a previous reconstructed frame and a current reconstructed frame in order to perform Intra/Inter prediction. The buffer size associated with the transform coefficients may be larger than the original frame since transform coefficients may require more bits than the original image data. For example, the original data is often in 8 bit resolution and the transform coefficients may require 12 bits or more for sufficient accuracy. Therefore, it is desirable to design an encoding system that can support the partitioned bitstream as mentioned above without the need for the transform coefficient memory and/or prediction data memory.

The complete Partition I bitstream can be generated except for the partition sizes, IIA-PS, IIB-PS, IIC-PS, etc. at the end of Partition I. The entropy coder 354 can then be switched to process transform coefficients according to the Partition II order. In the example of four token partitions, the entropy coder 354 will process macroblock rows 0, 4, 8, etc. in a sequential order and write the results in a second space of the bitstream buffer 356. The portions of the frame associated with Partitions IIA, IIB, IIC, . . . , etc. are called picture partitions in this disclosure. Accordingly, Partition IIA refers to macroblock rows 0, 4, 8, etc. When entropy encoding of rows designated for Partition IIA is complete, the partition size is known and the partition size can be written into IIA-PS at the end of Partition I. Upon the completion of entropy coding of Partition IIA, the entropy coding and bitstream generation proceeds to process the next partition until all partitions are processed.

In order to overcome the need for the transform coefficient memory and/or prediction memory, the transform coefficients and/or mode/motion vector for each macroblock have to be processed on the fly, i.e., the transform coefficients and/or mode/motion vector for each macroblock are processed in substantially real time to generate corresponding bitstream. Upon completing the current macroblock processing, the storage of transform coefficients and/or mode/motion vector for each macroblock can be disregarded, such as deleted or over-written. In the example of on-the-fly processing of transform coefficients, a macroblock coefficient buffer can be used to hold transform coefficients of a current block. The transform coefficients of the current block are processed by the entropy coder 354 in real time and are written into a data area allocated for the partition associated with the current macroblock in the bitstream buffer. The data area allocated for the partition associated with the current macroblock is associated with a data address where the bitstream for the current macroblock in the partition is written to the bitstream buffer indicated by the data address. The data address is initialized for the first macroblock in the partition. After the current macroblock is processed, the size of corresponding bitstream is known and the data address for the next macroblock in the partition can be calculated. The size of bitstream for each macroblock may be tracked using a counter. In order to support real time processing, the entropy coding for current macroblock should be completed before the data is over-written by the next coding unit start. While a single MB coefficient buffer may be sufficient, two MB coefficient buffers may also be used to hold transform coefficients for both the current macroblock and the next macroblock to simplify design.

Figure 4:
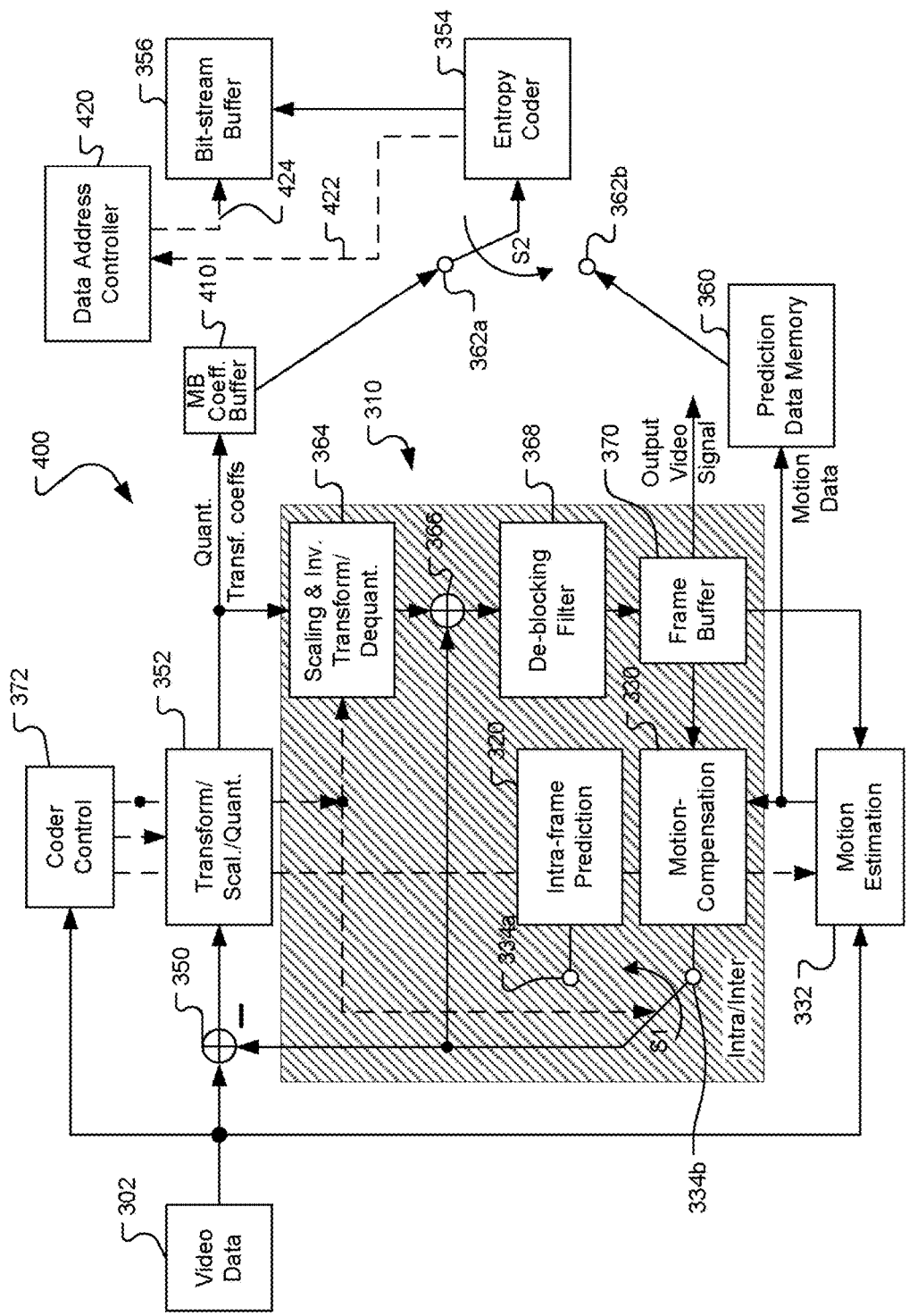
FIG. 4 illustrates a system block diagram for a motion compensated encoder according to one embodiment of the present invention, where a buffer for quantized transform coefficients of a current macroblock is used instead of the transform coefficient memory for the frame to generate partitioned bitstream.

FIG. 4 illustrates an exemplary video encoder embodying the present invention that processes transform coefficients for the macroblock on the fly. A macroblock (MB) coefficient buffer 410 is used to store transform coefficients of residues for a macroblock (Inter mode) or transform coefficients of a macroblock (Intra mode). While the transform coefficients are referred, the transform coefficients may be in quantized form. Therefore, the term "transform coefficients" interchangeably with the term "quantized transform coefficients" in this disclosure. Whenever the macroblock transform coefficients become available, the macroblock transform coefficients are processed by entropy coder 354 and the corresponding bitstream is written into a respective partition data area in the bitstream buffer 356. The embodiment according to the present invention also comprises a data address controller 420 to provide a data address 424 for the bitstream to be written. The address controller 420 will update the data address 424 according to the current data address and the size of the bitstream 422 corresponding to the current macroblock after the compressed data for the current macroblock is written. After the current macroblock transform coefficients are processed, the macroblock coefficient buffer 410 is ready for the next macroblock transform coefficients for processing. Therefore, the embodiment according to the present invention can use a small buffer 410 to hold one macroblock worth of transform coefficients instead of coefficient memory 358 to hold transform coefficients for the frame. If the partition corresponding to transform coefficients is further divided into multiple partitions, multiple macroblock coefficient buffers may be used for concurrent processing of multiple rows. Each of the multiple macroblock coefficient buffers provides storage space for transform coefficient of a small number of macroblocks. The bitstream after entropy coding of the transform coefficients corresponding to multiple picture partitions are written into respective multiple category II bitstream partitions, termed sub-logic units in this disclosure. A sub-memory address in the first logic unit is determined for each of the plurality of sub-logic units. The sub-memory address in the first logic unit is based on data size of the first compressed data for a current sub-logic units and a previous sub-memory address.

Figure 5B:
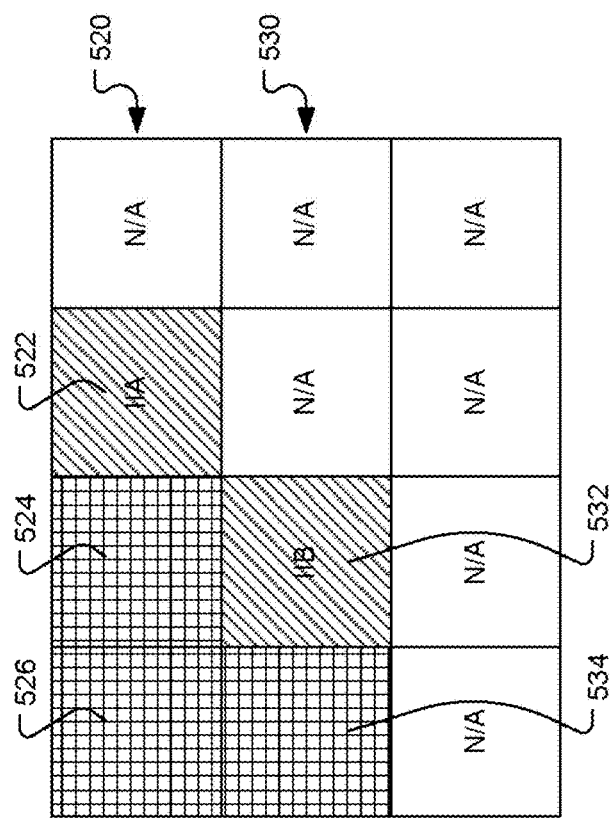
FIG. 5B illustrates an example of concurrent encoding of two rows of macroblocks.
Figure 5A:
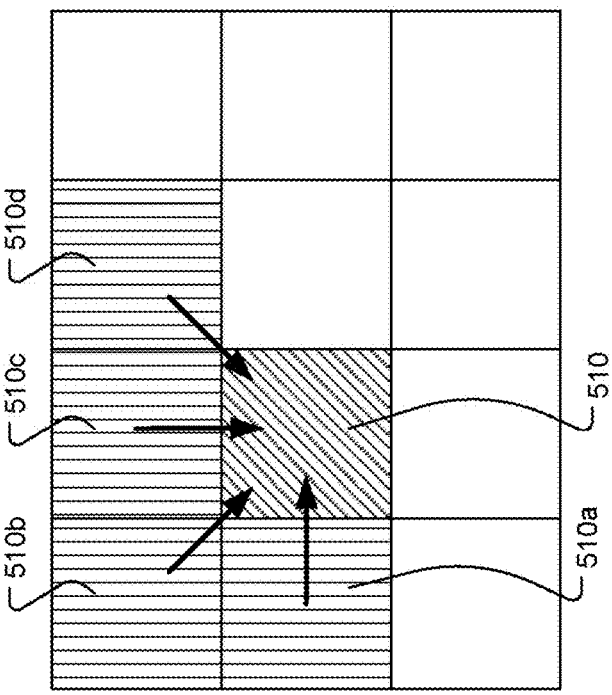
FIG. 5A illustrates an example of intra-prediction of a current macroblock based on neighboring reconstructed macroblocks.

FIG. 5A illustrates an intra-prediction of a current macroblock 510 using reconstructed neighboring macroblocks 510a-d in the same frame. The dependency of intra-prediction of the current macroblock is only related to the macroblock on the top, the macroblock to the left, the macroblock on top-left, and the block on top-right of the current macroblock. In fact, the latest macroblock in the previous row for intra-prediction of the current macroblock is the upper right macroblock 510d in the above example. Therefore, as soon as the reconstruction of macroblock 510d is available, the intra-prediction of the present macroblock 510 can be performed. Furthermore, the intra-prediction of the current macroblock 510 can be started by processing intra-prediction from macroblocks 510a-c while waiting for macroblock 510*d* reconstruction. For an inter-prediction macroblock, there is no dependence of neighboring macroblocks in the same frame. Accordingly, it is possible to perform encoding process of more than one row of macroblocks concurrently to generate partition bitstream. FIG. 5B illustrates an example of concurrent processing of two macroblock rows 520 and 530. Macroblock 522 is the current macroblock in row 520 being processed and macroblock 532 is the current macroblock in row 530 being processed. Macroblocks 524 and 526 are reconstructed macroblocks in row 520 and macroblock 534 is a reconstructed macroblock in row 530. A skilled person in the field can extend the above concurrent processing to more than two macroblock rows. As mentioned before, multiple macroblock coefficient buffers may be used for concurrent processing of multiple rows. The concurrent processing of multiple rows may share the same entropy coder 354 if the speed is fast enough.

Figure 6:
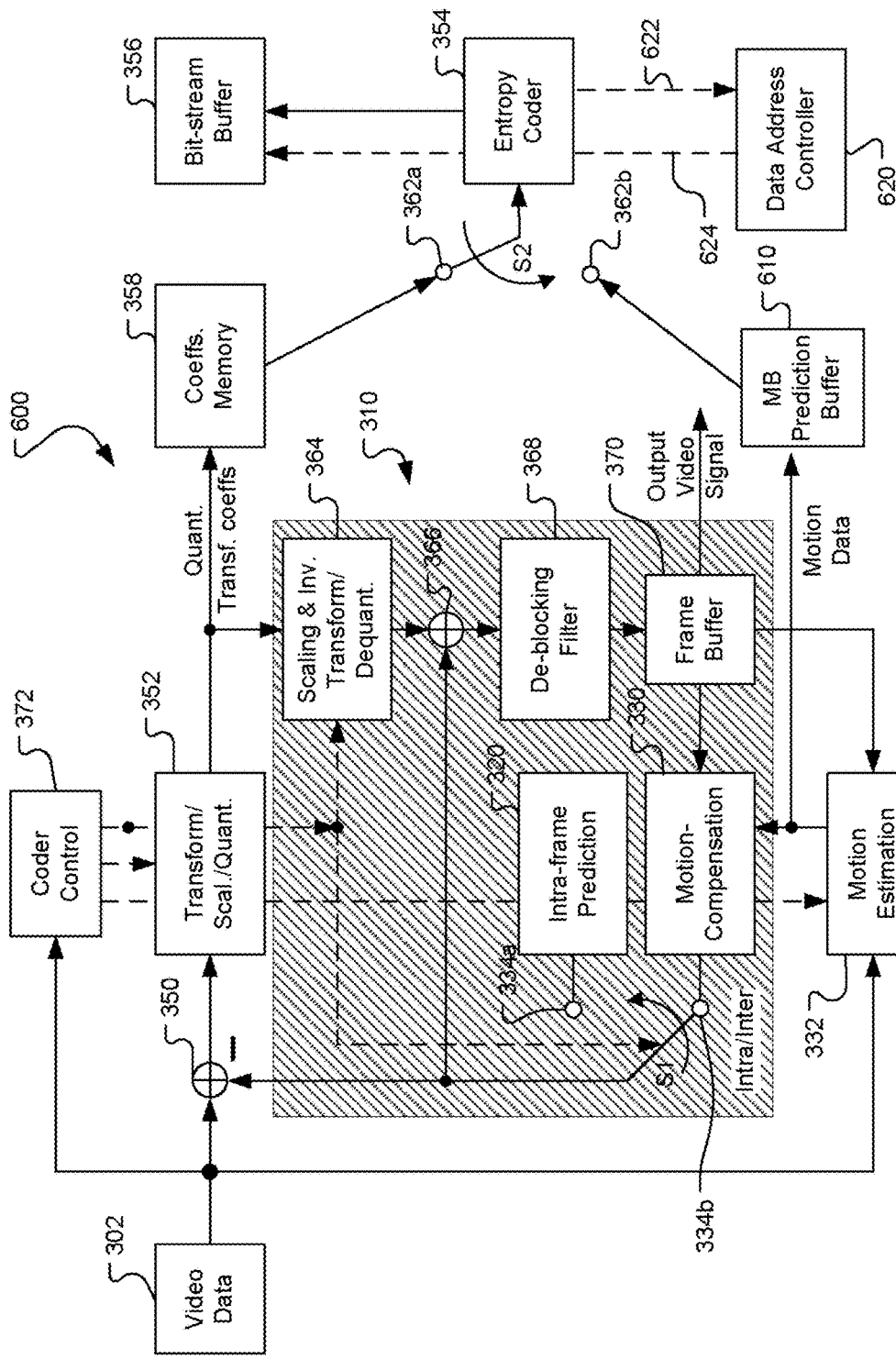
FIG. 6 illustrates a system block diagram for a motion compensated encoder according to one embodiment of the present invention, where a macroblock prediction buffer is used instead of prediction data memory for the frame to generate partitioned bitstream.

FIG. 6 illustrates another exemplary video encoder embodying the present invention that processes macroblock mode/motion vector for the macroblock on the fly. A macroblock mode/MV buffer 610 is used to store mode and motion vector for a macroblock. Whenever the mode and motion vector for the macroblock become available, the mode and motion vector for a macroblock are processed by entropy coder 354 and the corresponding compressed data is written into the Partition I data area in the bitstream buffer. The address controller 620 will update the data address 624 according to the current data address and the size of the compressed data 622 corresponding to mode/MV of the current macroblock after the compressed data for the current macroblock is written. After the current macroblock mode/MV are processed, the macroblock prediction buffer 610 is ready for the next macroblock mode/MV for processing. Therefore, the embodiment according to the present invention can use a small buffer to hold the mode/MV for the macroblock instead of modes/motion vectors for the frame. As mentioned before, the macroblock mode/MV buffer with space large enough for multiple macroblocks may also be used.

Figure 7:
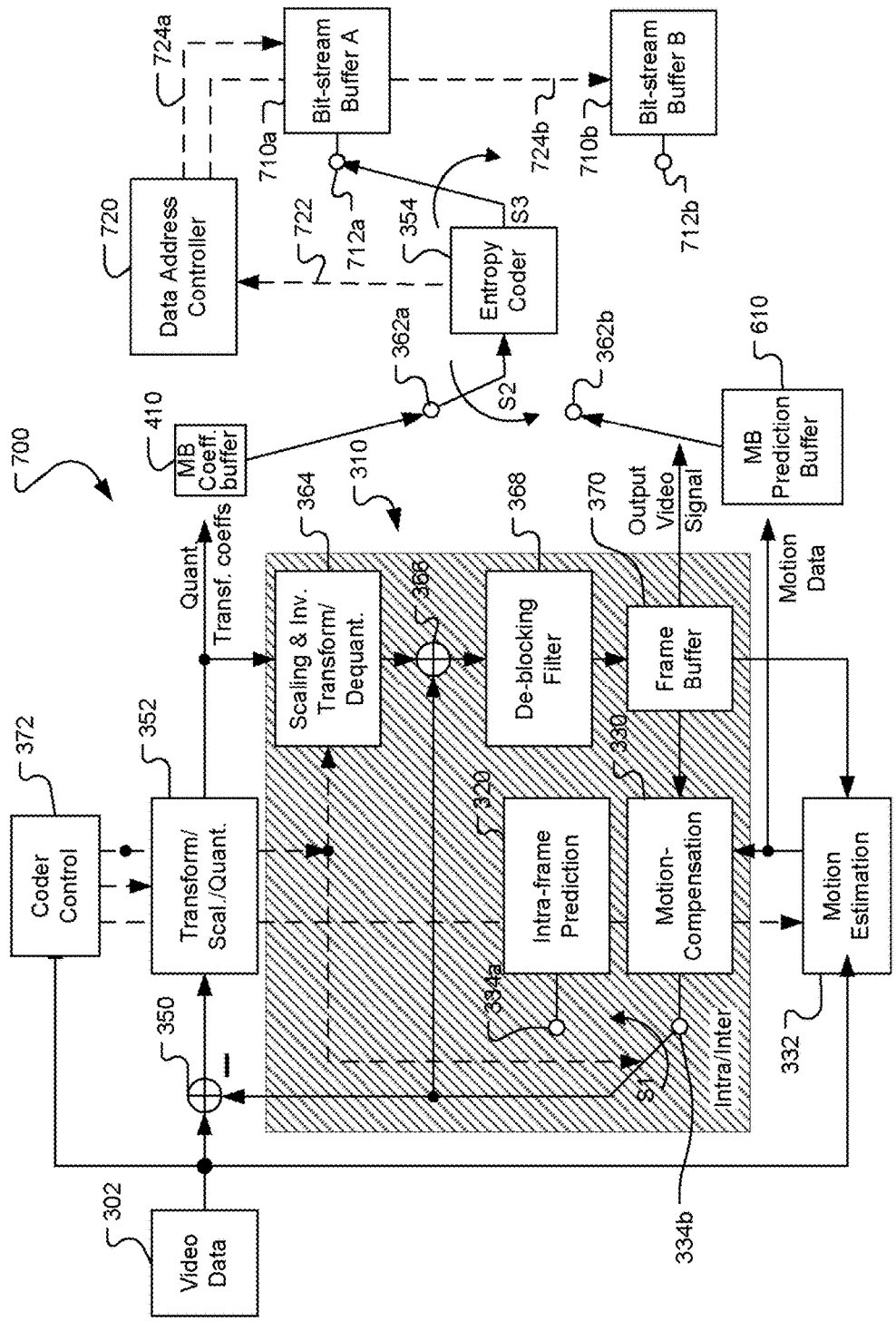
FIG. 7 illustrates a system block diagram for a motion compensated encoder according to one embodiment of the present invention, where a macroblock coefficient buffer and a macroblock prediction buffer are used instead of the transform coefficient memory and the prediction data memory for the frame to generate partitioned bitstream.

FIG. 7 illustrates yet another exemplary video encoder embodying the present invention that processes macroblock mode/motion vector and transform coefficients of residues for the macroblock on the fly. A macroblock coefficient buffer 410 is used to store transform coefficients of residues for a macroblock or transform coefficients of a macroblock. A macroblock mode/MV buffer 610 is used to store mode and motion vector for a macroblock. The entropy coder 354 has enough speed to process one macroblock coefficients and one macroblock mode/MV in real time. Therefore, both macroblock coefficients and macroblock mode/MV can be processed on the fly without the need to buffer macroblock coefficients and macroblock mode/MV for subsequent macroblocks. Furthermore, separate bitstream buffers 710*a* and 710*b* are used to store bitstreams corresponding to compressed transform coefficients and compressed modes/MVs respectively. Switch S3 is used to select the destination bitstream buffer (712*a* for bitstream buffer A and 712*b* for bitstream buffer B). The address controller 720 will update the data addresses 724*a* and 724*b* according to the current data addresses and the size of the compressed data 722 corresponding to transform coefficients and mode/MV of the current macroblock respectively after the compressed data for the current macroblock is written. In this example, the buffer memory requirement is substantially reduced for both transform coefficients and modes/MVs. While two separate bitstream buffers 710*a* and 710*b* are used, a single bitstream buffer may also be used as in the examples of FIG. 4 and FIG. 6.

Figure 8:
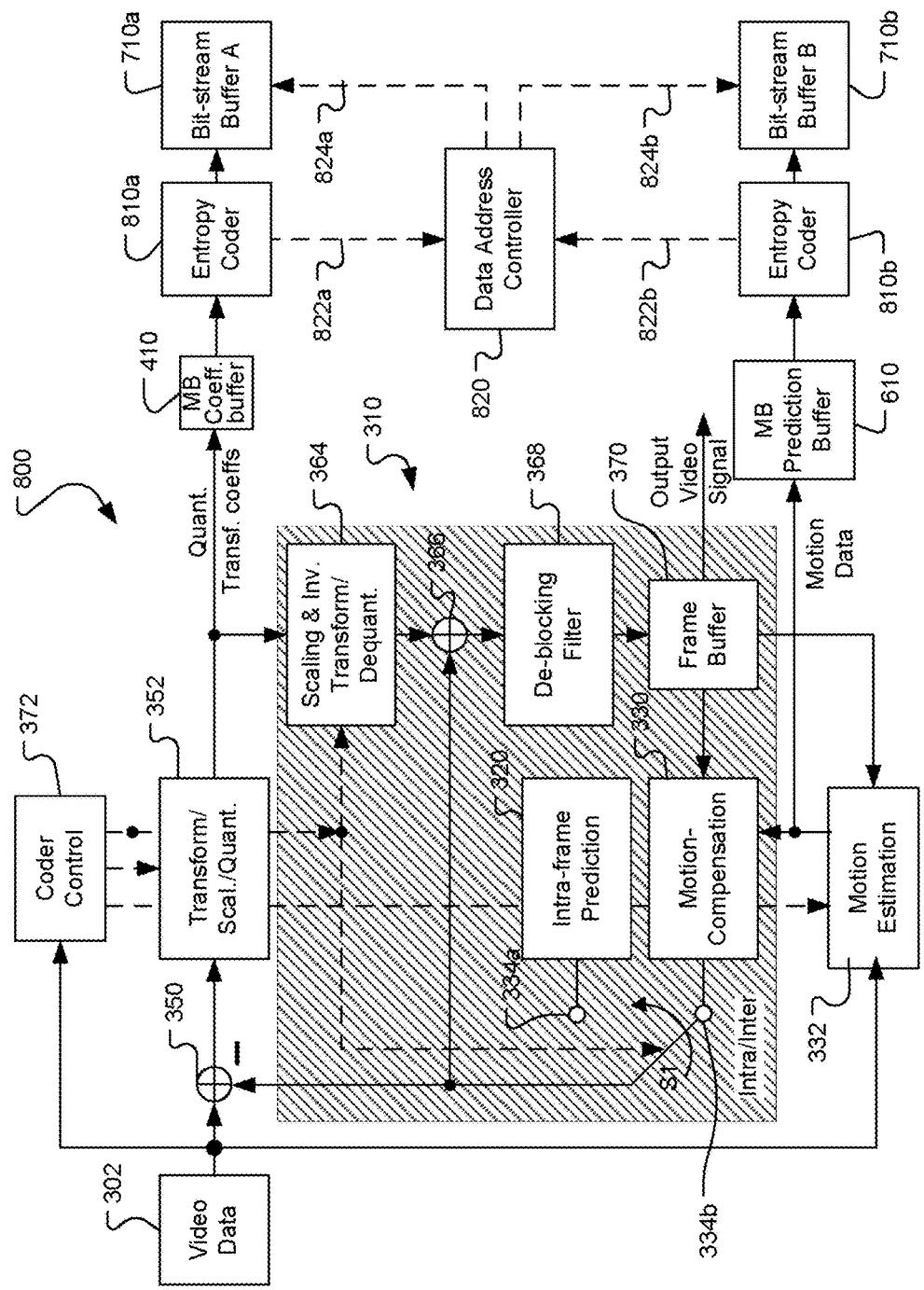
FIG. 8 illustrates a system block diagram for a motion compensated encoder according to another embodiment of the present invention similar to FIG. 7, where the transform coefficients and prediction data use individual entropy coders.

FIG. 8 illustrates an exemplary video encoder embodying the present invention that processes macroblock mode/motion vector and transform coefficients of residues for the macroblock on the fly. The encoder system in FIG. 8 is similar to that in FIG. 7 except that two separate entropy coders 810*a* and 810*b* are used. The address controller 820 receives size information associated with compressed data for the macroblock from entropy coders 810*a* and 810*b* respectively. The address controller 820 provides macroblock data addresses 824*a* and 824*b* to the bitstream buffers 710*a* and 710*b* respectively.

Figure 9:
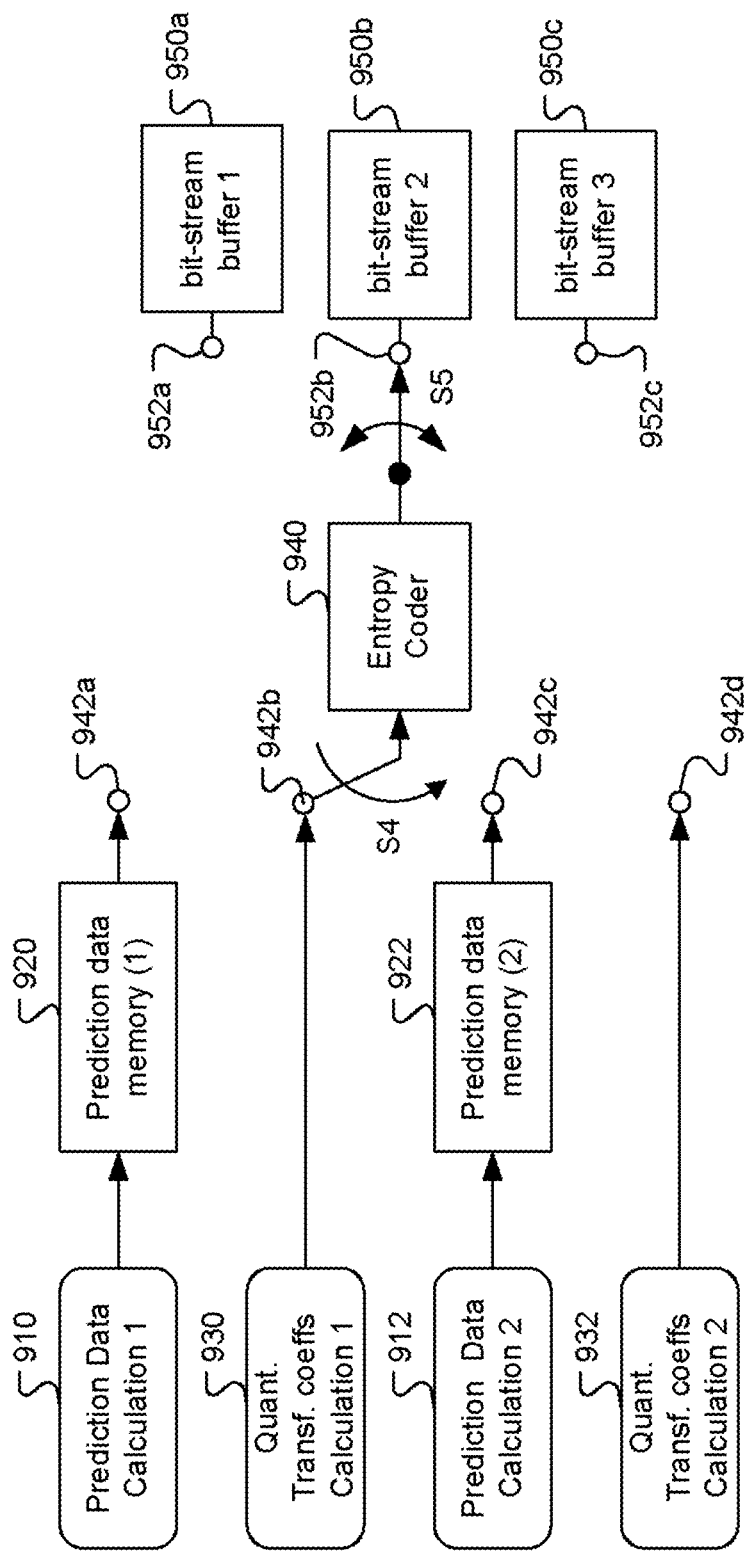
FIG. 9 illustrates an example of parallel processing to compute motion information and transform coefficients associated with macroblocks from two picture partitions.

As mentioned before, the coefficient partition may be further partitioned into multiple partitions to allow concurrent processing of multiple macroblock rows. FIG. 5B illustrates an example of concurrent processing of two macroblock rows, 520 and 530. An encoder system may use multiple processors to process multiple macroblock rows concurrently. When the encoding is implemented on a computer using a multiple-core CPU or on an integrated IC with multiple processors, the multiple-cores CPU or multiple processors can be configured to perform encoding on multiple macroblock rows concurrently. FIG. 9 illustrates an example of using two cores or processors to perform parallel processing on two macroblock rows. The first core or processor performs prediction data calculation 910 and transform/scaling/quantization calculation 930 for macroblocks in first picture partition (Partition IIA) and the second core or processor performs prediction data calculation 912 and transform/scaling/quantization calculation 932 for macroblocks in second picture partition (Partition IIB). Similar to the encoder system in FIG. 4, the macroblock transform coefficients are processed on the fly and there is no need to use coefficient memory for the frame except for a small macroblock coefficient buffer (not shown in FIG. 9). In the example of FIG. 9, a single entropy coder 940 is used to process motion information and coefficients from both picture partitions. Switch S4 selects an input from one of four inputs 942*a-d*. Three bitstream buffers 950*a-c* are used to store the compressed data. Bitstream buffers 950*a* through 950*c* may correspond to compressed data associated with Partition I, Partition IIA and Partition IIB (two coefficient partitions are used in this example) respectively. While three bitstream buffers are used in this example, a single bitstream buffer may be used as well to accommodate the three bitstreams. The prediction data memory shown in FIG. 9 may also be reduced to macroblock mode/MV as shown in FIG. 7 to take advantage of the present invention.

Figure 10:
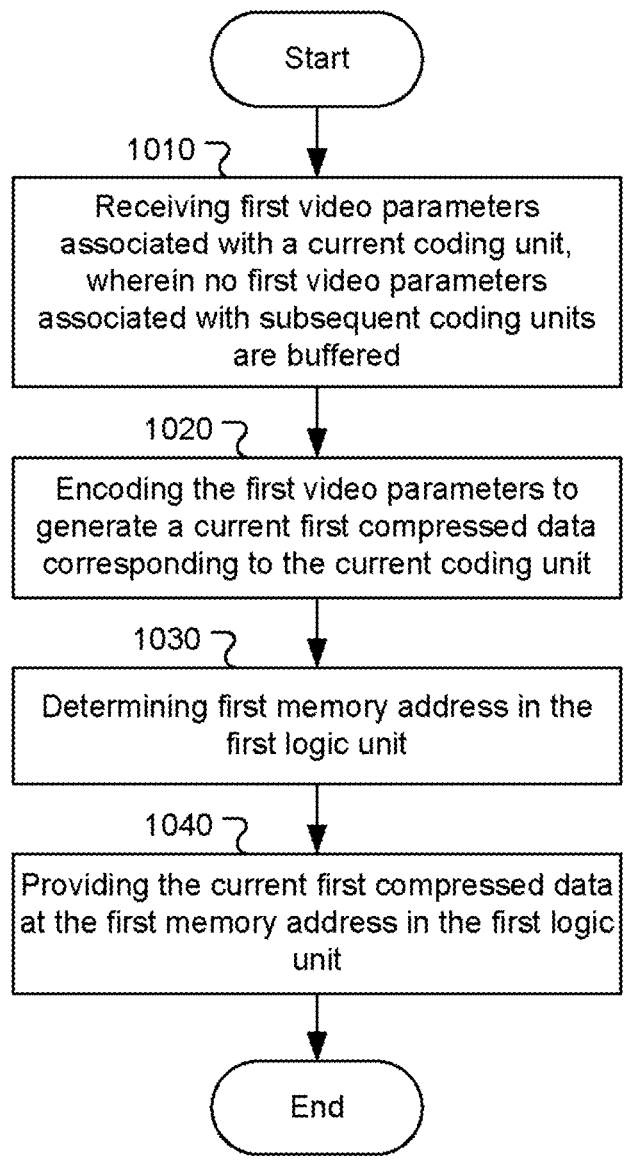
FIG. 10 illustrates an exemplary flowchart of an encoding system embodying the present invention.

An example to practice the present invention is illustrated in FIG. 10. In this example, a picture unit is encoded into a partitioned bitstream. The picture unit may be a frame, a field, or a partial frame such as a slice of frame consisting of a group of consecutive blocks. In order to allow a decoder to take advantage of multiple cores or processors, the bitstream is organized as a partitioned bitstream with two categories. As mentioned above, one category is related prediction data such as prediction mode and motion vectors and the other category is related to transform coefficients. An encoder incorporating an embodiment according to the present invention may encode the picture unit on a macroblock by macroblock basis and pack transform coefficients associated with the picture unit in a single category II partition. Alternatively, the picture unit may also be divided into regions so that transform coefficients associated with each region is packed in an individual category II partition.

While a 16.times.16 macroblock as adopted in various video coding standards such as MPEG-2 and H.264/AVC is used as an example of coding unit, other block sizes and configurations may also be used for the coding unit. The category I partition comprises prediction data, such as coding modes (mb_type, sub_mb_type, mb_skip, etc), reference index, intra prediction mode, QP information, filter parameter, and motion vectors associated with processing units of the picture unit. As mentioned before, by packing prediction data of the picture unit in category I partition allows data pre-fetching to set up concurrent decoding. The picture unit may be partitioned into multiple regions. The transform coefficients associated with processing units of the picture partitions are packed into respective category II sub-partitions.

FIG. 10 illustrates one exemplary flow chart for an encoder incorporating an embodiment according to the present invention. The encoding process starts with receiving first video parameters associated with a current coding unit, wherein no first video parameters associated with subsequent coding units are buffered as shown in step 1010. In various embodiment as described above and shown in associated figures (FIG. 4 and FIG. 6), the first video parameters can correspond to transform coefficients or motion data. The first video parameters are then encoded to generate a current first compressed data corresponding to the current coding unit as shown in step 1020. The process may use an entropy coder to achieve the needed compression. The first compressed data is then stored in a data area designated for the bitstream partition. As mentioned before, the data area is termed as a logic unit in this disclosure. A first memory address in the first logic unit has to be determined for first compressed data associated with the current coding unit as shown in step 1030. The first compressed data can then be stored in the first logic unit at the first memory address determined as shown in step 1040. FIG. 10 demonstrates an example to practice the present invention. A skilled person in the field may modify individual procedures and/or re-arrange the process order to achieve similar goal without departing from the spirit of the present invention.

Figure 11:
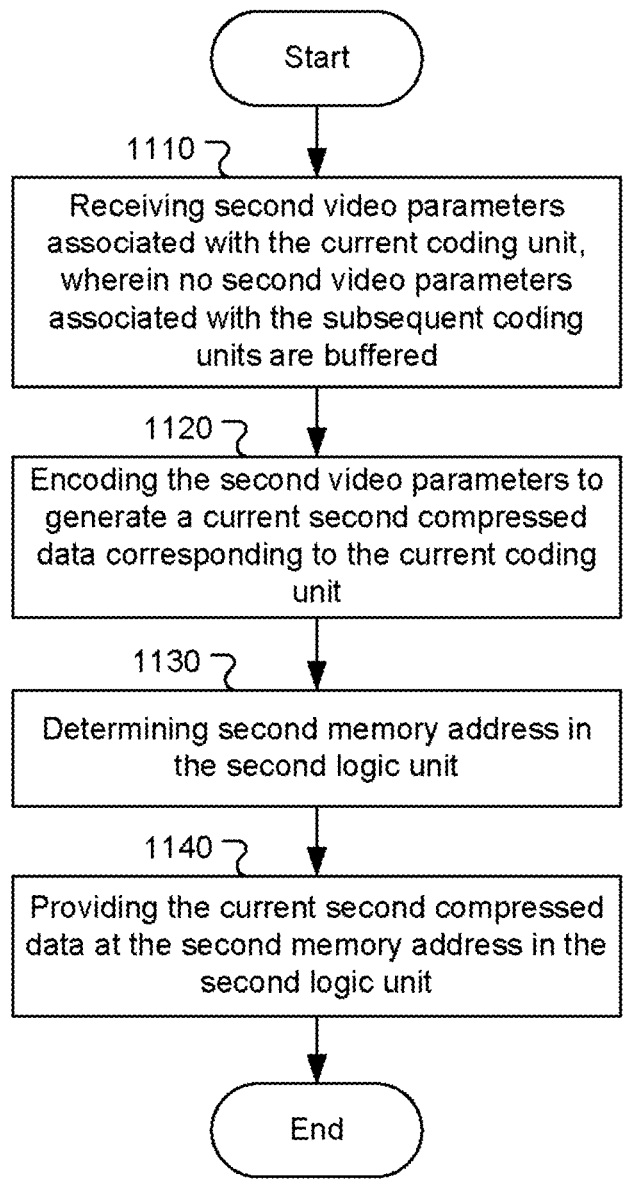
FIG. 11 illustrates another exemplary flowchart of an encoding system embodying the present invention.

FIG. 11 illustrates another exemplary flow chart for an encoder incorporating an embodiment according to the present invention. As shown in FIG. 7 and FIG. 8, the present invention may be applied to transform coefficients and motion data to create partitioned bitstream without the need of large memory to buffer data. The flow chart shown in FIG. 11 is intended for additional process to that of FIG. 10. The processes in FIG. 10 and FIG. 11 can be performed sequentially or parallelly. The encoding process for FIG. 11 starts with receiving second video parameters associated with the current coding unit, wherein no second video parameters associated with the subsequent coding units are buffered as shown in step 1110. The second video parameters are then encoded to generate a current second compressed data corresponding to the current coding unit as shown in step 1120. The process may use an entropy coder to achieve the needed compression. The second compressed data is then stored in a data area designated for the second bitstream partition. A second memory address in the second logic unit has to be determined for second compressed data associated with the current coding unit as shown in step 1130. The second compressed data can then be stored in the second logic unit at the second memory address determined as shown in step 1140. FIG. 11 demonstrates an example to practice the present invention. A skilled person in the field may modify individual procedures and/or re-arrange the process order to achieve similar goal without departing from the spirit of the present invention.

Embodiment of video encoding systems to generate partitioned bitstream according to the present invention as described above may be implemented in various hardware, software codes, or a combination of both. For example, an embodiment of the present invention can be multiple processor circuits integrated into a video compression chip or program codes integrated into video compression software to perform the processing described herein. An embodiment of the present invention may also be program codes to be executed on a computer CPU having multiple CPU cores or Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of video encoding to generate partitioned bitstream comprising a first logic unit and a second logic unit, the first logic unit comprises first compressed data corresponding to coding units of a coding unit group and the second logic unit comprises second compressed data corresponding to the coding units, the method comprising:
receiving first video parameters and second video parameters, wherein the first video parameters correspond to either quantized transform coefficients or other non-transform-coefficient coding data of the coding units, but not both, and the second video parameters correspond to either the non-transform-coefficient coding data or the quantized transform coefficients of the coding units not belonging to the first video parameters;
storing the first video parameters associated with one or more coding units including a current coding unit in a first buffer, wherein whenever first video parameters associated with one coding unit are available in the first buffer, an entropy coder is operable to start processing the first video parameters associated with said one coding unit;
encoding the first video parameters stored in the first buffer to generate a current first compressed data corresponding to the current coding unit;
determining first memory address in the first logic unit;
providing the current first compressed data at the first memory address for the first logic unit in response to said determining first memory address in the first logic unit before the whole second logic unit is generated and providing current second compressed data corresponding to the second video parameters for the second logic unit before the whole first logic unit is generated, wherein the first compressed data and the second compressed data associated with one or more same coding units are provided to the first logic unit and the second logic unit respectively; and determining second memory address in the second logic unit, wherein the current second compressed data corresponding to the second video parameters is provided at the second memory address for the second logic unit in response to said determining second memory address in the second logic unit before the whole first logic unit is generated.

2. The method of claim 1, wherein said determining the second memory address in the second logic unit is based on data size of the current second compressed data and a previous second memory address.

3. The method of claim 1, wherein whenever second video parameters associated with said one coding unit are available in a second buffer, the entropy coder or another entropy coder starts processing the second video parameters associated with said one coding unit.

4. The method of claim 1, wherein the coding unit is configured as a macroblock.

5. The method of claim 1, wherein said encoding the first video parameters to generate the current first compressed data utilizes a first entropy coder.

6. The method of claim 1, wherein said determining the first memory address in the first logic unit is based on data size of the current first compressed data and a previous first memory address.

7. The method of claim 1, wherein the first logic unit is further partitioned into a plurality of sub-logic units, where each of the plurality of sub-logic units corresponds to the first compressed data of the coding units associated with a region of the coding unit group.

8. The method of claim 7, wherein first video parameters associated with the sub-logic units are concurrently processed.

9. The method of claim 8, wherein the first buffer comprises a plurality of buffers arranged to buffer the first video parameters associated with the sub-logic units, respectively, and concurrent processing of the first video parameters associated with the sub-logic units shares the entropy coder.

10. The method of claim 7, wherein the region of the coding unit group consists of one or more rows of the coding units.

11. The method of claim 7, wherein said encoding the first video parameters to generate the current first compressed data utilizes a first entropy coder or a plurality of first entropy coders.

12. The method of claim 7, further comprising determining a sub-memory address in the first logic unit for said each of the plurality of sub-logic units.

13. The method of claim 12, wherein said determining the sub-memory address in the first logic unit is based on data size of the first compressed data for a current sub-logic units and a previous sub-memory address.

14. The method of claim 1, wherein the second video parameters associated with the current coding unit comprise prediction data associated with the current coding unit.

15. The method of claim 1, further comprises: encoding the second video parameters to generate the current second compressed data, wherein said encoding the first video parameters to generate the current first compressed data utilizes a first entropy coder, and wherein said encoding the second video parameters to generate the current second compressed data utilizes the first entropy coder or a second entropy coder.

16. An apparatus for video encoding to generate partitioned bitstream comprising a first logic unit and a second logic unit, the first logic unit comprises first compressed data corresponding to coding units of a coding unit group and the second logic unit comprises second compressed data corresponding to the coding units, each of the first compressed data and each of the second compressed data are able to reconstructed one of the coding units, the apparatus comprising one or more electronic circuits configured to:

receive first video parameters and second video parameters, wherein the first video parameters correspond to either quantized transform coefficients or other non-transform-coefficient coding data of the coding units, but not both, and the second video parameters correspond to either the non-transform-coefficient coding or the quantized transform coefficients of the coding units not belonging to the first video parameters;

store the first video parameters associated with one or more coding units including a current coding unit in a first buffer, wherein whenever first video parameters associated with one coding unit are available in the first buffer, an entropy coder is operable to start processing the first video parameters associated with said one coding unit;

encode the first video parameters stored in the first buffer to generate a current first compressed data corresponding to the current coding unit;

determine first memory address in the first logic unit;

provide the current first compressed data at the first memory address for the first logic unit in response to said determining first memory address in the first logic unit before the whole second logic unit is generated and providing current second compressed data corresponding to the second video parameters for the second logic unit before the whole first logic unit is generated, wherein the first compressed data and the second compressed data associated with one or more same coding units are provided to the first logic unit and the second logic unit respectively; and determining second memory address in the second logic unit, wherein the current second compressed data corresponding to the second video parameters is provided at the second memory address for the second logic unit in response to said determining second memory address in the second logic unit before the whole first logic unit is generated.

* * * * *